United States Patent [19]

Schumacher

[11] Patent Number: 4,779,486
[45] Date of Patent: Oct. 25, 1988

[54] RATE BIASED DIFFERENTIAL GEAR MOMENTUM COMPENSATED ACTUATOR

[76] Inventor: Larry L. Schumacher, 18876 Tenderfoot Trail, Newhall, Calif. 91321

[21] Appl. No.: 67,257

[22] Filed: Jun. 29, 1987

[51] Int. Cl.$^4$ ............................................. F16H 37/06
[52] U.S. Cl. ........................................ 74/675; 74/793
[58] Field of Search .................. 74/793, 801, 802, 674, 74/675

[56] References Cited

U.S. PATENT DOCUMENTS

| | | | |
|---|---|---|---|
| 286,206 | 10/1883 | Lavery | 74/802 |
| 1,777,490 | 10/1930 | Hardie | 74/802 |
| 1,951,424 | 3/1934 | Lewis | 74/802 |
| 1,981,789 | 11/1934 | Gerard | 74/802 X |
| 2,441,111 | 5/1948 | Delaplace | 74/802 |
| 2,969,696 | 1/1961 | Fraga | 74/675 X |
| 3,960,036 | 6/1976 | Moller | 74/802 X |
| 4,265,142 | 5/1981 | Watanabe | 74/802 X |
| 4,295,391 | 10/1981 | Philpott et al. | 74/675 |
| 4,406,178 | 9/1983 | Gillade | 74/802 X |

FOREIGN PATENT DOCUMENTS

| | | | |
|---|---|---|---|
| 1098341 | 3/1981 | Canada | 74/802 |
| 833515 | 4/1960 | United Kingdom | 74/675 |

Primary Examiner—Rodney H. Bonck
Assistant Examiner—Dwight G. Diehl

[57] ABSTRACT

The differential gear momentum compensated actuator is a mechanism that maintains the rotational rate of a planetary carrier relative to a sun gear a constant negative multiple of the rotational rate of the pointed device relative to the sun gear enabling momentum compensation, but when the angular rate of the pointed device relative to its support bearing races is zero, large non linear friction torques act on the pointed device and prevent precision device pointing. The improved rate biased differential gear momentum compensated actuator is a mechanism for rotationally articulating the sun gear relative to the base vehicle at a biased angular rate while the pointed device independently tracks the target angular rate. The bias angular rate of the rotational reference sun gear results in each pointed device support ball bearing race having a different rotational rate thus preventing stiction friction torques from acting on the pointed device.

3 Claims, 1 Drawing Sheet

RATE BIASED DIFFERENTIAL GEAR MOMENTUM COMPENSATED ACTUATOR

FIELD OF THE INVENTION

The invention is a motor driven differential gear mechanism for rotationally articulating a pointed device relative to a planetary carrier.

BACKGROUND OF THE INVENTION

Momentum compensated rotational actuators are required to rotationally articulate precision pointed devices in a pointing disturbance rich environment with constraints on the pointing control momentum magnitude imparted to the supporting structure. Many momentum compensation devices use mechanical mechanisms such as the differential gear with means to minimize mechanical backlash to maintain the ratio of the rotational rate of the planetary carrier relative to the rotational rate of the pointed device a negative constant.

Precision pointing also requires precise control of the net torque from all sources acting on the pointed device, and currently there are no means to accurately measure either pointed device control torques or disturbance torques. Pointed device control torque is generally determined as a function of observed inertial states such as angular acceleration, angular rate, and angular position of the base structure, the pointed device, or both. Disturbance torques acting on the pointed device over most of the operational range are generally a continuous well behaved function of the pointed device angular rate relative to its bearing support structure and have been adequately controlled over a restricted operational range for most precision pointing applications. However, when the pointed device angular rate relative to the bearing support structure passes through zero, large, extremely non-linear friction torques act on the pointed device through the rotational support bearings making disturbance torque prediction, control, and precision pointing in this region impossible. Accordingly, it is the object of this invention to provide a means to eliminate the non linear friction torque effects over a large operational angular rate range on a precision pointed device rotationally driven relative to the base vehicle by a momentum compensated, differential gear, rotary actuator.

SUMMARY OF THE INVENTION

The differential gear momentum compensated rotary actuator without rate bias consists of a sun gear, rotationally fixed to the base vehicle structure, which is the rotational reference for planetary gears which are driven around the periphery of the sun gear by planetary drive motors. The planetary gears, planetary drive motors, support structure, and supplemental inertia mass are all part of the planetary carrier. The planetary gears also engage the periphery of a platform gear attached to the pointed device. The platform gear is a different diameter than the sun gear to assure the rotational rate of the platform gear relative to the rotational reference sun gear is of opposite polarity than the rotational rate of the planetary carrier structure relative to the rotational reference sun gear. In the preferred embodiment the angular momentum of the pointed device relative to the sun gear is equal and opposite to the angular momentum of the planetary carrier relative to the sun gear providing disturbance free device pointing for the base vehicle, but the angular rate of the pointed device relative to its support bearings still generally passes through zero due to periodic base body motion making precision device pointing in this region unacceptable due to the non linear friction torques.

The rate biased differential gear momentum compensated rotary actuator with rate bias consists of a sun gear which is the rotational reference for planetary gears which are driven around the periphery of the sun gear by planetary drive motors. The rate bias is achieved by having the sun gear rotationally driven at a biased angular rate relative to the base vehicle structure by a motor and speed reducing mechanism. The pointed device pointing control system commands the planetary motors to torque the pointed device relative to the planetary carrier structure until the desired target tracking angular rate is achieved, and in the preferred embodiment the angular momentum of the pointed device relative to the sun gear is offset by the angular momentum of the planetary carrier relative to the sun gear. But, since the sun gear has a constant angular rate larger than any anticipated base body disturbance rates, each of the pointed device support bearing races never have the same angular rate relative to the base vehicle eliminating non linear bearing friction disturbance torques.

Another improvement has the rotational interface between the sun gear and the platform gear rotationally supported relative to a rigid shaft which is in turn rotationally supported relative to the base vehicle. Forces orthogonal to the rigid shaft on the sun and platform gears due to tooth mesh errors and mass offsets are transferred to the base vehicle without disturbing device pointing.

DESCRIPTION OF THE PREFERRED EMBODIMENT

Figure 1:
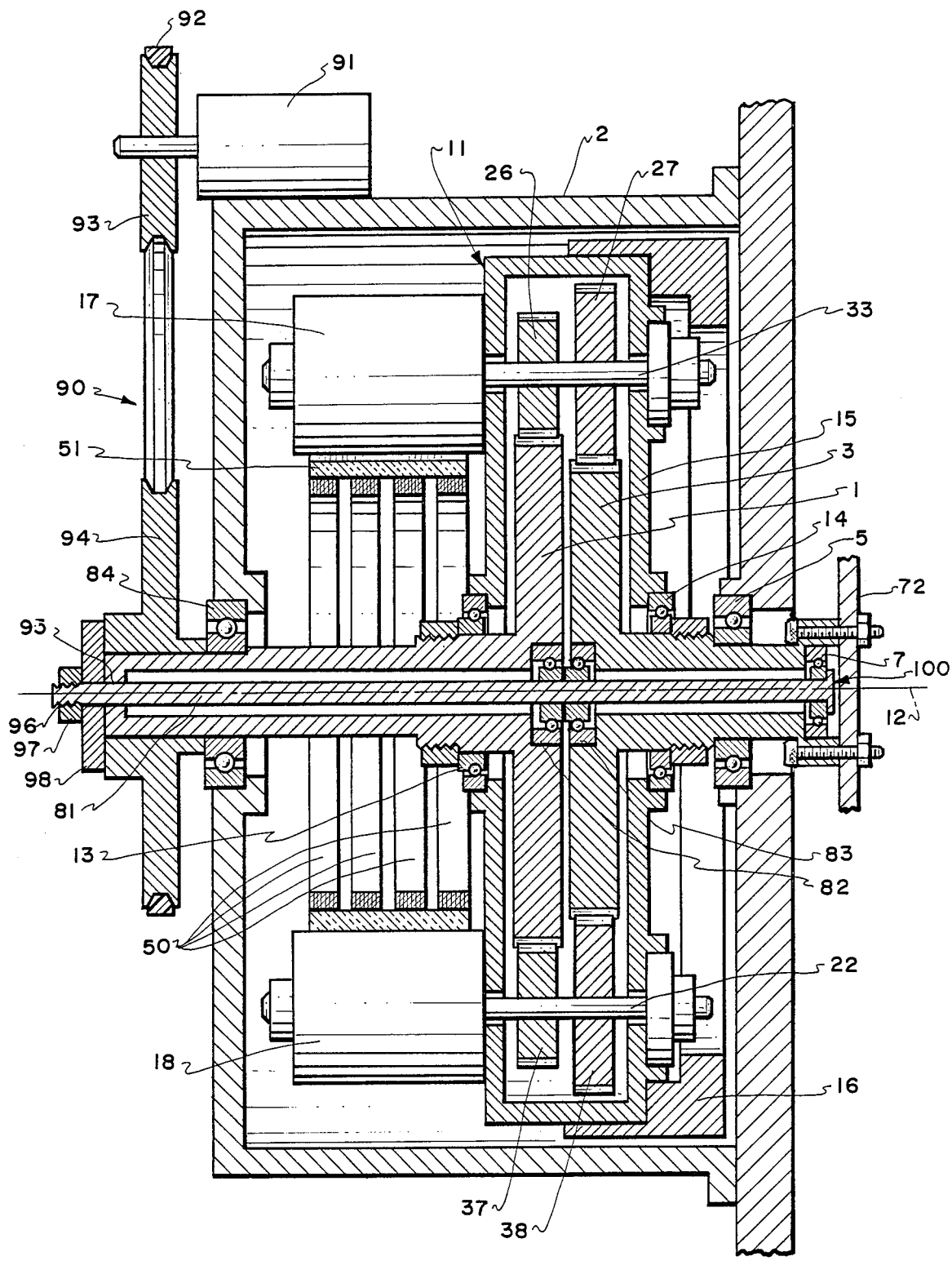
FIG. 1 is a section view of the rate biased differential gear momentum compensated actuator with unsectioned elements that are unnecessary for description of the invention.

The rate biased differential momentum compensated actuator consists of a differential gear mechanism consisting of a sun gear 1 rotationally supported relative to base vehicle structure 2 by bearing 84 and rotationally supported relative to shaft 81 by bearing 82, a platform gear 3 rotationally supported relative to shaft 81 by bearing 83 and rotationally supported relative to base vehicle structure 2 by bearing 3, and planetary carrier 11.

Compensating inertia 11 is rotationally supported relative to gear 1 by bearing 13 and rotationally supported relative to gear 3 by bearing 14 around actuator rotation axis 12 which is fixed in base vehicle 2. Planetary carrier 11 consists of compensating inertia support structure 15 supporting flywheel mass 16, and planetary drive motors 17, 18, planetary drive motor shafts 22, 33 and planetary gears 26, 27 and 37, 38.

Power is provided to motors 17, 18 by cylindrical conductive slip rings 50 attached to a cylindrical insulator 51 fixedly attached to motors 17, 18 such that insulator 51 rotates with carrier 11.

Operationally motors 17, 18 torque shafts 22, 33 relative to planetary carrier structure 15 causing gears 26, 37 to rotate around the periphery of sun gear 1 and gears 27, 38 to rotate around the periphery of platform gear 3. By correct selection of the ratio of the diameter of gears 26 or 37 relative to the diameter of gear 1 and the ratio of the diameter of gears 27 or 38 relative to the diameter of gear 3, assures that the angular rate of the planetary carrier 11 relative to sun gear 1 is a negative constant multiple of the angular rate of the platform gear 3 relative to sun gear 1.

Non linear external disturbance torque reduction on pointed device 72 results from rotationally supporting sun gear 1 in ball bearing 84 relative to base vehicle structure 2, and rotationally driving sun gear 1 at a constant angular rate relative to base vehicle structure 2 with mechanism 90. Mechanism 90 consists of motor 91 fixedly attached to base vehicle structure 2 rotationally driving sun gear 1 through belt 92 and pulley 93 attached to motor 91 and pulley 94 attached to sun gear 1.

As motors 17, 18 drive gears 26, 27 and gears 37, 38 around the periphery of gears 1 and 3, tooth mesh errors between gears 26 or 37 and gear 1 would result in translational deflection of the unsupported end of sun gear 1 orthogonal to axis 12, and tooth mesh errors between gears 27 or 38 and platform gear 3 would result in the translational deflection of the unsupported end of gear 3 orthogonal to axis 12. Rigid shaft 81 is slideably attached at 95 to sun gear 1 and transfers any forces at 95 orthogonal to axis 12 through bearing 84 to base vehicle structure 2. The rigid shaft 81 is rotationally supported relative to gear 3 by bearing 83 which permits relative rotation between gear 1 and gear 3 and transfers any forces orthogonal to axis 12 through bearing 5 and bearing 7 to base vehicle structure 2. At the rotational interface of gears 1 and 3, forces orthogonal to axis 12 acting on gear 1 are transferred to shaft 81 by bearing 82, and forces orthogonal to axis 12 on gear 3 are transferred to shaft 81 by bearing 83.

Shaft 81 is threaded at 96 with nut 97, washer 98 and shaft end 100 provides a means to shorten the linear distance parallel to axis 12 between washer 98 and shaft end 100 providing simultaneous preload forces parallel to axis 12 to bearings 84, 82, 83, 7, 5.

Having described the invention I claim:

1. A rate biased momentum compensated rotary actuator having a differential gear mechanism with a differential sun gear acting as a rotational reference, a differential platform gear being attached to a pointed device, planetary gears being driven by planetary drive motors relative to a planetary carrier around the periphery of the differential sun and the differential platform gear with the planetary carrier including planetary gears and drive motors wherein the improvement comprises ball bearings rotationally supporting a differential sun gear relative to the base vehicle structure and a ball bearing supporting the differential sun gear relative to a rigid shaft on the actuator rotational axis, the rigid shaft being supported relative to the base vehicle structure by the differential sun gear and by the differential platform gear.

2. A rate biased momentum compensated rotary actuator having a differential gear mechanism with a differential sun gear acting as a rotational reference, a differential platform gear being attached to a pointed device, planetary gears being driven by planetary drive motors relative to a planetary carrier around the periphery of the differential sun and the differential platform gear with the planetary carrier including planetary gears and drive motors wherein the improvement comprises an electric motor to rotationally articulate the differential sun gear relative to the base vehicle structure, a electric motor being attached to the base vehicle structure and rotationally driving the differential sun gear through a speed reduction means.

3. A rate biased momentum compensated rotary actuator having a differential, gear mechanism with a differential sun gear acting as a rotational reference, a differential platform gear being attached to a pointed device, planetary gears being driven by planetary drive motors relative to the planetary carrier around the periphery of a differential sun and the differential platform gear with the planetary carrier supporting the planetary gears and the drive motors wherein the improvement comprises means to rotationally support the rotational interface of the differential sun and the differential platform gear being a rigid shaft supported on one end by the differential sun gear to transmit forces orthogonal to the rigid shaft to ball bearings supporting the differential sun gear relative to a base vehicle and supported on the opposite shaft end relative to the differential platform gear by a bearing permitting relative rotation between the rigid shaft and the differential platform gear and transmitting forces orthogonal to the rigid shaft to a ball bearing supporting the differential platform gear relative to the base vehicle.

* * * * *